United States Patent [19]

Ishiwata et al.

[11] Patent Number: 5,404,259
[45] Date of Patent: Apr. 4, 1995

[54] MAGNETIC HEAD HAVING HIGH WEAR RESISTANCE AND NON-MAGNETIC SUBSTRATE USED IN THE MAGNETIC HEAD

[75] Inventors: Nobuyuki Ishiwata; Toshiyuki Okumura; Haruo Urai, all of Tokyo; Mitsuo Tamura; Masataka Konno, both of Miyagi, all of Japan

[73] Assignees: NEC Corporation, Tokyo; Tokin Corporation, Miyagi, both of Japan

[21] Appl. No.: 966,354

[22] Filed: Oct. 26, 1992

[30] Foreign Application Priority Data

Oct. 25, 1991 [JP] Japan .................. 3-305539

[51] Int. Cl.$^6$ .............. G11B 5/255; G11B 5/147
[52] U.S. Cl. .............. 360/122; 360/126; 428/900
[58] Field of Search ............ 360/122, 126; 428/692, 428/693, 694 ST, 501, 900

[56] References Cited

U.S. PATENT DOCUMENTS

| | | | |
|---|---|---|---|
| 3,999,216 | 12/1976 | Berchtold | 360/125 |
| 4,598,052 | 7/1989 | Wada et al. | 360/122 |
| 4,816,128 | 3/1989 | Wada et al. | 427/130 |
| 5,157,569 | 10/1992 | Kumasaka et al. | 360/122 |
| 5,162,960 | 11/1992 | Sakata et al. | 360/126 |
| 5,162,961 | 11/1992 | Takahashi et al. | 360/120 |
| 5,168,407 | 12/1992 | Shimuzu et al. | 360/103 |
| 5,227,940 | 7/1993 | Isomura et al. | 360/122 |
| 5,231,555 | 7/1993 | Itoh et al. | 360/126 |
| 5,242,865 | 9/1993 | Nagase et al. | 501/1 |

FOREIGN PATENT DOCUMENTS

| | | |
|---|---|---|
| 248965 | 10/1990 | Japan . |
| 3263306 | 11/1991 | Japan . |
| 4141810 | 5/1992 | Japan . |

*Primary Examiner*—A. J. Heinz
*Assistant Examiner*—George J. Letscher
*Attorney, Agent, or Firm*—Sughrue, Mion, Zinn, Macpeak & Seas

[57] ABSTRACT

In order to improve a wear resistance and recording and reproducing properties of a magnetic head which has a magnetic core having a magnetic gap and a penetrated hole, a pair of reinforcing members holding the magnetic core therebetween, each having an opening corresponding to the penetrated hole, and a winding wound onto the magnetic core and the reinforcing members through the penetrated hole and the opening, each of the reinforcing member is a non-magnetic substrate which is made of a ceramic material essentially consisting of 2–30 weight % CaO, 2–50 weight % $TiO_2$, and 30–80 weight % NiO and having an average grain size of 2 μm or less. Alternatively, another ceramic is used which essentially consists of 2–30 weight % CaO, 2–50 weight % $TiO_2$, 30–80 weight % NiO, and 0.2–1 weight % $Al_2O_3$, and having an average grain size of 2 μm or less, excluding zero.

10 Claims, 10 Drawing Sheets

10μm

10μm

10μm

10μm

10 μm

10 μm

10μm

10μm

MAGNETIC HEAD HAVING HIGH WEAR RESISTANCE AND NON-MAGNETIC SUBSTRATE USED IN THE MAGNETIC HEAD

BACKGROUND OF THE INVENTION

The present invention relates to a non-magnetic substrate for a magnetic head and to a magnetic head having a high wear resistance.

A magnetic head is used for magnetically recording and reproducing an information signal for a magnetic recording medium such as a magnetic tape.

Development of high density magnetic recording requires a magnetic recording medium of an increased coercive force and a magnetic head using a magnetic core of an increased saturated magnetic flux density corresponding to the increased coercive force. Metallic magnetic materials having a high magnetic permeability and a low coercive force, for example, Fe-Si-Al alloy which is so called "Sendust" (trademark) and a certain amorphous alloy, have a high saturated magnetic flux density in comparison with the known ferrite. Therefore, magnetic heads have been developed which use those metallic magnetic materials for magnetic cores.

A typical one of such magnetic heads comprises a magnetic film as a magnetic core having a magnetic gap, reinforcing members supporting the magnetic film core, and a coil or coils wound on the magnetic film core and the reinforcing members. The magnetic head of this type will be referred to as a superposed type head in the following description.

In a known magnetic head of the the superposed type, the magnetic core film is made of "Sendust" alloy (which is an FeSiAl alloy or an alloy of FeSiAl added with Cr, Ru, Ti and the like) sputtered on a non-magnetic substrate as one of the reinforcing members (Japanese Patent publication No. 2-48965, Reference I).

Japanese Patent Application No. 2-23686 (Reference II) discloses another head of the type wherein the magnetic core film is made of a sputtered alloy film which essentially consists of Fe, N, and M (M is at least one selected from a group of Ta, Hf, Nb, Zr, V and Ti). The alloy has a saturated magnetic flux density higher than the "Sendust" alloy.

Generally, the magnetic head, in detail, the magnetic core and the reinforcing members are worn by sliding contact with the magnetic recording medium during magnetic recording and reproducing. Accordingly, it is important for actual use of those magnetic heads disclosed in References I and II to grade up the wear resistance of the heads.

In the magnetic head disclosed in Reference I, MnO-NiO substrate is used for the reinforcing members. In order to improve the wear resistance, Japanese Patent Application No. 2-264320 (Reference III) proposes to use CaO-TiO$_2$-NiO substrate having a relatively high wear resistance for the reinforcing members. However, the magnetic head using the substrate of CaO-TiO$_2$-NiO is insufficient in the recording and reproducing properties. Further, the higher wear resistance is desired for the magnetic head.

SUMMARY OF THE INVENTION

It is an object of the present invention to improve the recording and reproducing efficiency and wear resistance of the head using the CaO-TiO$_2$-NiO substrate.

It is a main object of the present invention to provide a non-magnetic CaO-TiO$_2$-NiO substrate having an improved wear resistance for use in a magnetic head.

It is another object to provide a magnetic head using the improved CaO-TiO$_2$-NiO substrate for the reinforcing members which has an extended life time and an improved recording and reproducing properties.

According to the present invention, a non-magnetic substrate is provided for use as reinforcing members in a magnetic head which is made of a ceramic material essentially consisting of CaO, TiO$_2$, and NiO, and having an average grain size of 2 μm or less, excluding zero.

Another non-magnetic substrate is also provided for use as the reinforcing members in a magnetic head which is made of a ceramic material essentially consisting of CaO, TiO$_2$, NiO, and Al$_2$O$_3$, and having an average grain size of 2 μm or less.

According to the present invention, a magnetic head is obtained which uses one of those two non-magnetic substrates described above for reinforcing members in the magnetic head. That is, a magnetic head is obtained which comprises a magnetic core having a magnetic gap and a penetrated hole, a pair of reinforcing members holding the magnetic core therebetween, each having an opening corresponding to the penetrated hole, and a winding wound onto the magnetic core and the reinforcing members through the penetrated hole and the opening, wherein each of the reinforcing member is a non-magnetic substrate which is made of a ceramic material essentially consisting of CaO, TiO$_2$, and NiO and having an average grain size of 2 μm or less, excluding zero.

Another magnetic head is also obtained which comprises a magnetic core having a magnetic gap and a penetrated hole, a pair of reinforcing members holding the magnetic core therebetween, each having an opening corresponding to the penetrated hole, and a winding wound onto the magnetic core and the reinforcing members through the penetrated hole and the opening, wherein each of the reinforcing member is a non-magnetic substrate which is made of a ceramic material essentially consisting of CaO, TiO$_2$, NiO, and Al$_2$O$_3$, and having an average grain size of 2 μm or less, excluding zero.

It is preferable that CaO, TiO$_2$, and NiO are 2–30 weight %, 2–50 weight %, and 30–80 weight %, respectively. In case Al$_2$O$_3$ is included in addition to the above-described composition, Al$_2$O$_3$ is 0.1–2 weight %.

In those magnetic heads the magnetic core is preferably made of a magnetic material essentially consisting of Fe, Si, and Al. Alternatively, the magnetic core can be made of a magnetic material essentially consisting of Fe, N, and M (M is at least one selected from a group of Ta, Hf, Nb, Zr, V and Ti).

DESCRIPTION OF PREFERRED EMBODIMENTS

Figure 1:
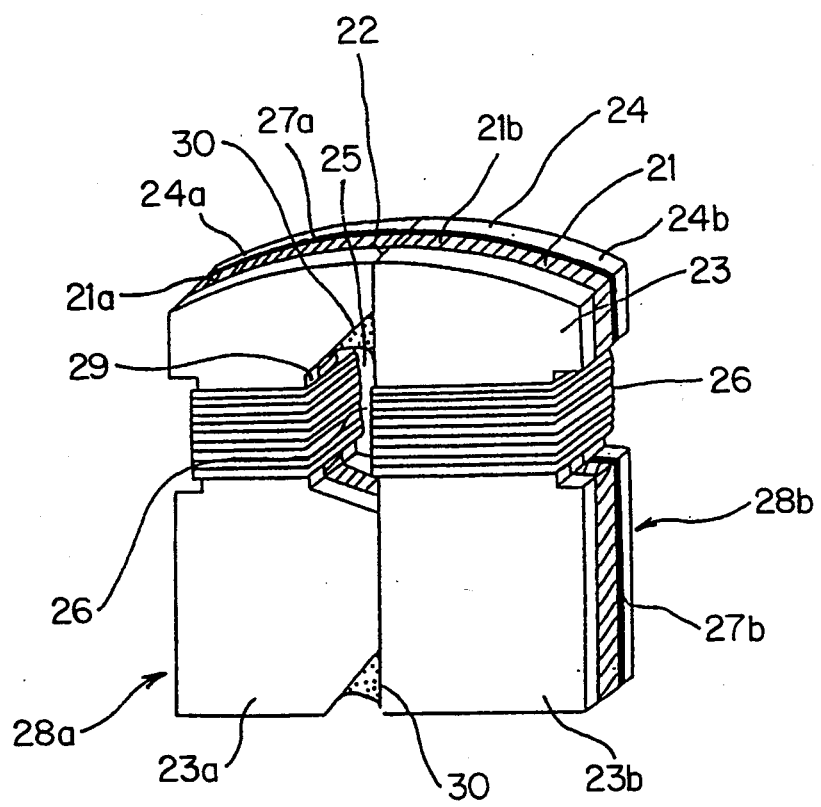
FIG. 1 is a perspective view illustrating a magnetic head for which the present invention is applicable.

Referring to FIG. 1, a magnetic head for which the present invention can be applied comprises a magnetic core 21 having a magnetic gap 22, and reinforcing non-magnetic substrates 23 and 24 holding the magnetic core 21 therebetween. The magnetic core 21 and the non-magnetic substrates 23 and 24 have a hole as formed therethrough to define a winding opening or window 25. Coils 26 are wound on and around the magnetic core 21 and non-magnetic substrates 23 and 24 through the winding opening 25.

In detail, magnetic films 21a and 21b are formed by, for example, sputtering onto surfaces two sheets of non-magnetic substrates 23a and 23b. Two sheets of non-magnetic substrates 24a and 24b are jointed onto the magnetic films 21a and 21b by jointing glass layers 27a and 27b, respectively, to form two core blocks 28a and 28b. The core block 28a has a cut-away portion 29 in one end surface. The two core blocks 28a and 28b are jointed together at their end surfaces by use of jointing glass 30. Thus, the magnetic films 21a and 21b form the magnetic core 21 with the gap 22. Two sheets of non-magnetic substrates 23a and 23b and another two sheets of non-magnetic substrates 24a and 24b form the two non-magnetic substrates 23 and 24, respectively, which hold the magnetic core 21 therebetween.

The constructional structure of the magnetic shown in FIG. 1 is known in the prior art.

According to the present invention, a Fe-Si-Al alloy film, a film Fe-Si-Al alloy having a small amount of additives such as Ru, Ti, Cr and/or the like, or another film of a Fe-N-M alloy, M being at least one selected from a group of Ta, Hf, Nb, Zr, V, and Ti, can be used as the magnetic core 21.

As each of non-magnetic substrates 23 and 24, a ceramic material of $CaO$-$TiO_2$-$NiO$ or $CaO$-$TiO_2$-$NiO$-$Al_2O_3$ is used which is characterized by an average grain size of 2 μm or less, excluding zero.

Those ceramics are generally produced by mixing raw materials, presintering the mixture to form a presintered body, pulverizing the presintered body to form a powder, pressing the powder into a desired compact body, and sintering the compact body.

In order to make an average size of grains in the ceramic 2 μm or less, excluding zero it is usual to extend a time for the pulverizing so as to form the powder having a smaller particle radius, or to use the sintering temperature lower than a usual sintering temperature. It can alternatively be achieved by $Al_2O_3$ content of 0.1–2 weight % in the ceramic.

Figure 2:
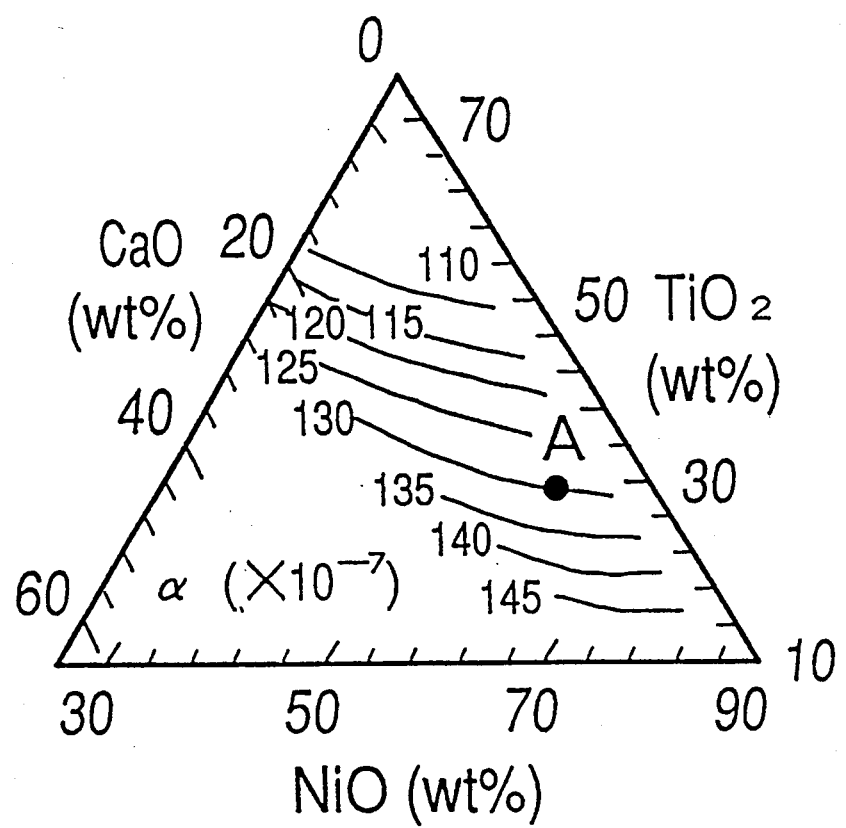
FIG. 2 is a view illustrating variation of a thermal expansion coefficient of various CaO-TiO$_2$-NiO ceramic compositions.

The thermal expansion coefficient of the non-magnetic $CaO$-$TiO_2$-$NiO$ ceramic is variable according to the amount ratio of ingredients of the ceramic, as shown in FIG. 2. The reinforcing non-magnetic substrate used in the magnetic head is required to have the thermal expansion coefficient nearly equal to that of the magnetic core. Therefore, it is preferable to use, for the reinforcing non-magnetic substrate, the $CaO$-$TiO_2$-$NiO$ ceramic wherein $CaO$, $TiO_2$ and $NiO$ are 2–30 wt %, 2–50 wt % and 30–80 wt %.

Figure 3:
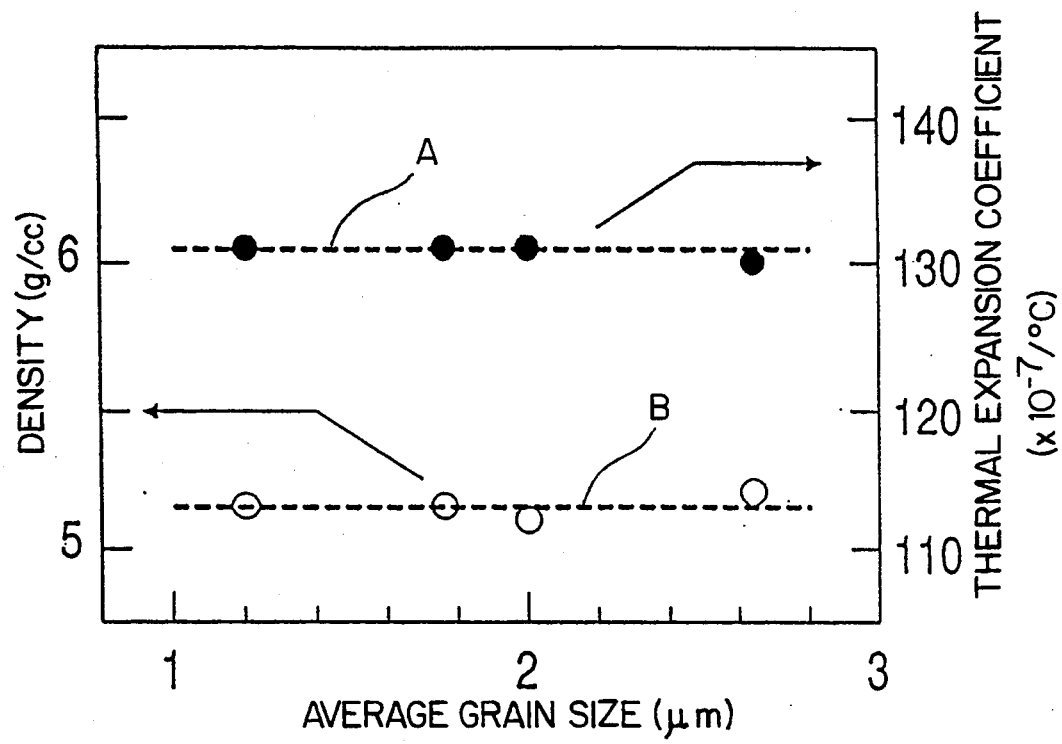
FIG. 3 is a view illustrating relationships of the thermal expansion coefficient and density of a CaO-TiO$_2$-NiO ceramic composition with an average grain size in the ceramic.

Ceramics of composition A (20 wt % $CaO$, 28 wt % $TiO_2$, and 52 wt % $NiO$) in FIG. 2 were produced with various grain sizes. It was confirmed as shown in FIG. 3 that no change occurred in the thermal expansion coefficient (a dashed line A) and the density (another dashed line B) by variation of the grain size. However, as shown at a dashed line A in FIG. 4, the Vickers hardness of the ceramic was confirmed to increase in dependence on reduction of the grain size. Then, a magnetic film of FeAlSi was sputtered onto those ceramic substrates and a coercive force of the magnetic film was measured. As a result, the coercive force of the magnetic film is reduced according to reduction of the grain size in the ceramic as shown at a solid line B in FIG. 4. This means that the ceramic is useful for the reinforcing non-magnetic substrate in the magnetic head in improvement of the wear resistance and the recording and reproducing efficiency.

Now, several examples will be described as the reinforcing non-magnetic substrates, below.

EXAMPLE 1

Reagents of titanium dioxide (99% or more in purity), calcium carbonate and nickel oxide (99% or more in purity) which are commercially available were weighed according to the composition A (20 wt % $CaO$, 28 wt % $TiO_2$, and 52 wt % $NiO$) in FIG. 2 to form a mixture. The mixture was mixed sufficiently for 20 hours or more in a plastic ball mill containing plastic coated balls and pure water. The mixture was obtained by filtration and dried, and then presintered in an alumina tray at 800°–1200° C. for 2 hours or more to form a presintered body. Then, the presintered body was pulverized in a magnetic ball mill using magnetic balls and pure water for different pulverizing time periods, that is, a usual pulverizing time of 20 hours, and 100 hours or more longer than the usual pulverizing time. After filtration and drying, powders having different particle sizes were obtained. Each of the powders was mixed with a 8% PVA solution of 10 wt % amount in an agitator, separated by a filtration through a screen of 28 mesh, subjected to a moisture adjustment, and then pressed under a pressure of 1 t/cm$^2$ by a hydrauric press into a pressed rectangular body of 40 mm×50 mm×10 mm.

The rectangular body was sintered in the atmosphere at various sintering conditions to form different sintered bodies. The various conditions were an usual condition of 1200° C. for two hours, another condition of 1150° C. for two hours, or another condition of 1100° C. for two hours. Thereafter, each of the sintered bodies was subjected to a HIP (got Isostatic Pressing) treatment at 1100° C.×1000 kg×1 hour by a HIP machine. As a result, six ceramic samples were produced.

A microstruture of each of those ceramic samples was observed by use of a microscope. The microphotographs illustrating the microstructures of four ceramic samples are shown in FIGS. 5–8.

Figure 5:
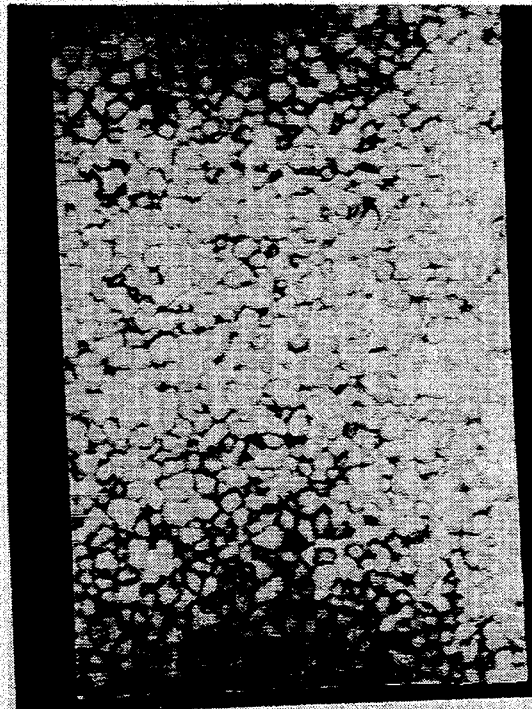
FIG. 5 shows a microstructure of a ceramic sample which was subjected to the pulverizing time of 20 hours and the sintering temperature of 1200° C.

FIG. 5 shows a microstructure of a ceramic sample which was subjected to the pulverizing time of 20 hours and the sintering temperature of 1200° C. The sample has an average grain size of 2.64 μm.

Figure 6:
FIG. 6 shows a microstructure of another ceramic sample which was subjected to the pulverizing time of 100 hours and the sintering temperature of 1200° C.

FIG. 6 shows a microstructure of another ceramic sample which was subjected to the pulverizing time of 100 hours and the sintering temperature of 1200° C. The sample has an average grain size of 1.98 μm.

Figure 7:
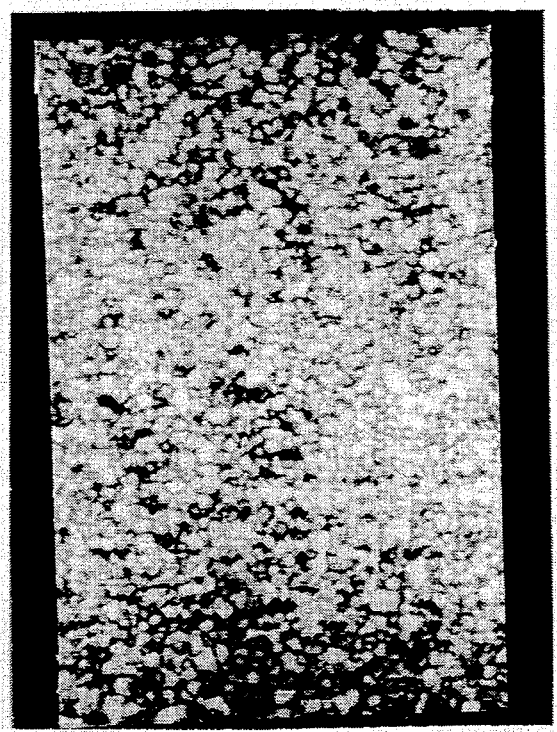
FIG. 7 shows a microstructure of another ceramic sample which was subjected to the pulverizing time of 100 hours and the sintering temperature of 1150° C.

FIG. 7 shows a microstructure of another ceramic sample which was subjected to the pulverizing time of 100 hours and the sintering temperature of 1150° C. The sample has an average grain size of 1.75 μm.

Figure 8:
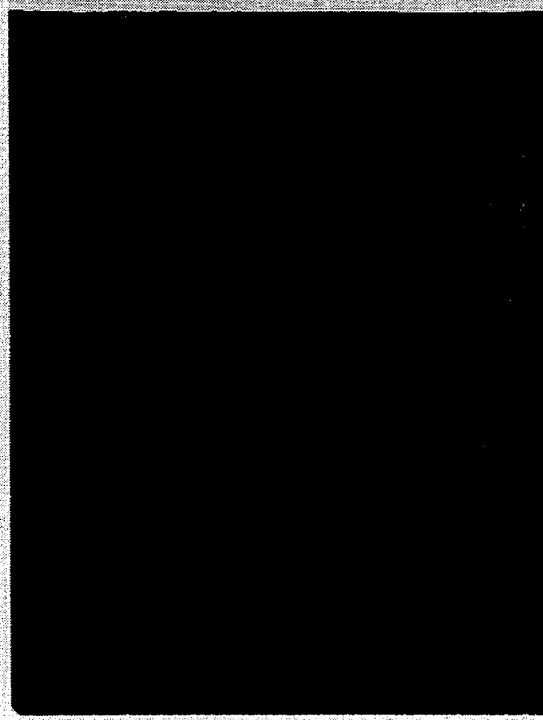
FIG. 8 shows a microstructure of another ceramic sample which was subjected to the pulverizing time of 100 hours and the sintering temperature of 1100° C.

FIG. 8 shows a microstructure of another ceramic sample which was subjected to the pulverizing time of 100 hours and the sintering temperature of 1100° C. The sample has an average grain size of 1.2 μm.

The thermal expansion coefficients of those ceramic samples were measured and it was confirmed that they are not different from each other.

Each of those ceramic samples was, then, polished to have a mirror finished surface and cleansed. An FeSiAl film was formed with a thickness of 5 μm onto the mirror finished surface by the magnetron sputtering technique, and was subjected to a heat treatment at 600° C. for two hours. Then, the coercive force of the magnetic film was measured.

Further, each of those ceramic samples was measured in the Vickers hardness thereof.

Figure 4:
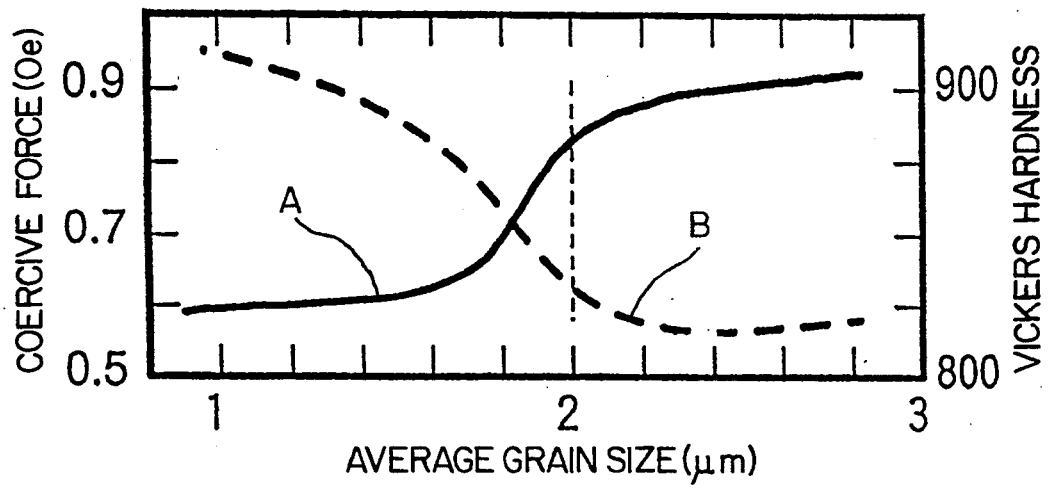
FIG. 4 is a view illustrating a relationship of Vickers hardness of the CaO-TiO$_2$-NiO ceramic composition with an average grain size in the ceramic, and a relationship of a coercive force of a Sendust film formed on the ceramic with the average grain size in the ceramic.

The measured data are shown in FIG. 4 which shows reduction of the coercive force and increase of the Vickers hardness for the grain size of 2 μm or less, excluding zero.

EXAMPLE 2

Reagents of titanium dioxide (99% or more in purity), calcium carbonate and nickel oxide (99% or more in purity) which are commercially available were weighed according to a predetermined composition and $Al_2O_3$ was added by a different amount of 0 wt %, 0.5 wt %, 2 wt %, and 5 wt % to form different mixtures. Each of the different mixtures was mixed sufficiently for 20 hours or more in a plastic ball mill containing plastic coated balls and pure water. The mixture was obtained by filtration and dried, and then presintered in an alumina tray at 800°–1200° C. for 2 hours or more to form a presintered body. Then, the presintered body was pulverized in a magnetic ball mill using magnetic balls and pure water for 20 hours. After filtration and drying, a powder was obtained. The powder was mixed with a 8% PVA solution of 10 wt % amount in an agitator, separated by a filtration through a screen of 28 mesh, subjected to a moisture adjustment, and then pressed under a pressure of 1 t/cm² by a hydrauric press into a pressed rectangular body of 40 mm×50 mm×10 mm. The rectangular body was sintered in the atmosphere at a usual condition of 1200° C. for two hours to form a sintered body. The sintered body was then subjected to a HIP treatment at 1100° C.×1000 kg×1 hour by a HIP machine. As a result, four ceramic samples were produced.

A microstructure of each of those four ceramic samples was observed by use of a microscope. The microphotographs illustrating microstructures of those four ceramic samples are shown in FIGS. 9–12.

Figure 9:
FIG. 9 shows a microstructure of a ceramic sample containing no $Al_2O_3$ additive.

FIG. 9 shows a microstructure of a ceramic sample containing no $Al_2O_3$ additive. The sample has an average grain size of 2.64 μm.

Figure 10:
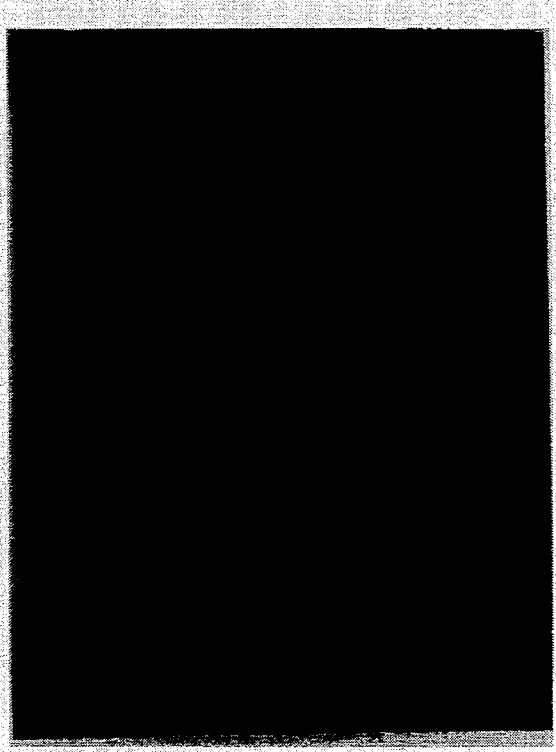
FIG. 10 shows a microstructure of a ceramic sample containing $Al_2O_3$ additive of 0.5 wt %.

FIG. 10 shows a microstructure of another ceramic sample containing $Al_2O_3$ additive of 0.5 wt %. The sample has an average grain size 1.9 μm.

Figure 11:
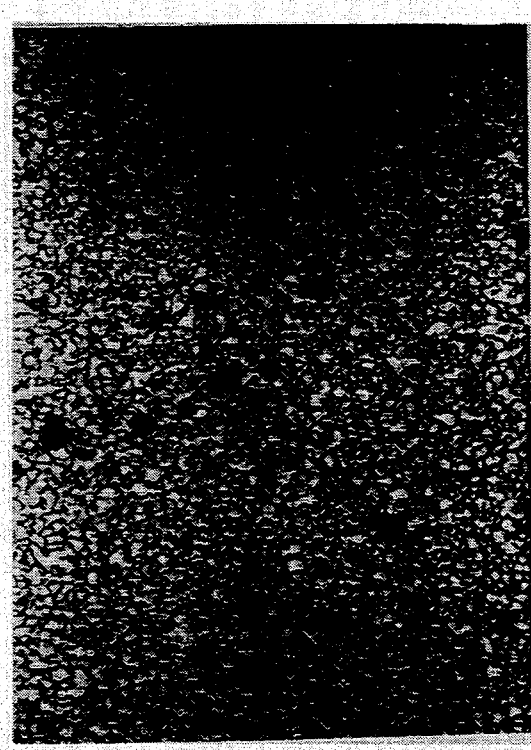
FIG. 11 shows a microstructure of a ceramic sample containing $Al_2O_3$ additive of 2 wt %.

FIG. 11 shows a microstructure of another ceramic sample containing $Al_2O_3$ additive of 2 wt %. The sample has an average grain size of 1.6 μm.

Figure 12:
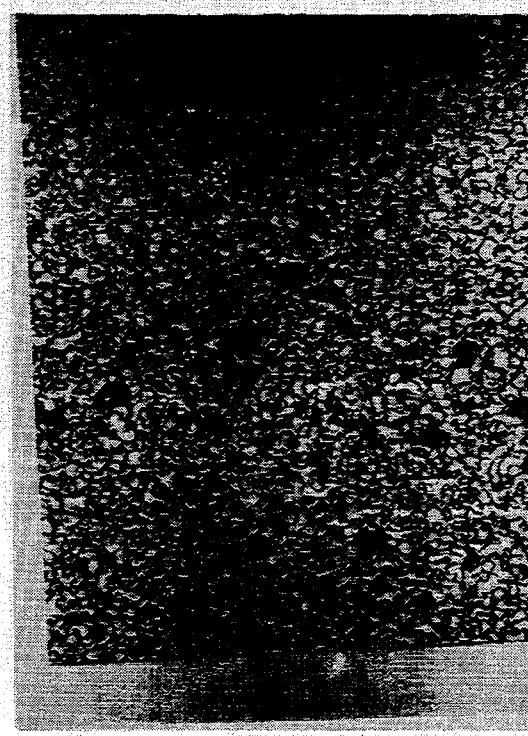
FIG. 12 shows a microstructure of a ceramic sample containing $Al_2O_3$ additive of 5 wt %.

FIG. 12 shows a microstructure of another ceramic sample containing $Al_2O_3$ additive of 5 wt %. The sample has an average grain size of 1.6 μm. In this ceramic sample, precipitation of $Al_2O_3$ was remarkably observed.

Each of those ceramic samples was polished to have a mirror finished surface and cleansed. An FeSiAl film was formed with a thickness of 5 μm on the mirror finished surface by the magnetron sputtering technique, and was subjected to a heat treatment at 600° C. for two hours. Then, the coercive force of the magnetic film was measured. Further, each of those ceramic samples were subjected to measurement of Vickers hardness. The result was similar to the data as shown in FIG. 4 and reduction of the coercive force and increase of the Vickers hardness were observed for the grain size of 2 μm or less, excluding zero.

Magnetic heads according to embodiments of the present invention comprise a structure shown in FIG. 1. In the magnetic heads, the reinforcing non-magnetic substrate was made of $CaO-TiO_2-NiO$ ceramics of the composition A in FIG. 2 but having different average grain sizes of 2.64 μm and 1.2 μm, respectively.

A magnetic core was formed of four layers of 5 μm thick FeSiAl sputtered films superposed through 0.1 μm thick $Al_2O_3$ films interposed between adjacent FeSiAl films. A length and a depth of a magnetic gap were formed 0.3 μm and 27 μm, respectively.

Figure 13:
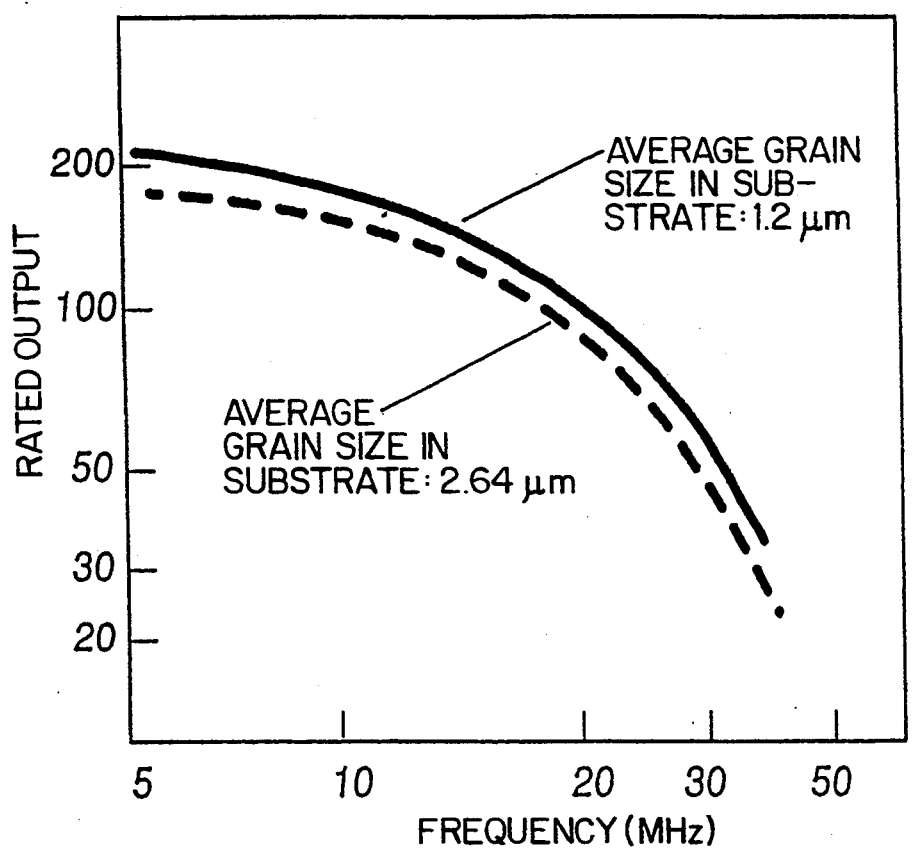
FIG. 13 is a view illustrating reproducing properties of magnetic heads according to a conventional type and an embodiment of the present invention.

Then, each of those two magnetic heads was tested for reproduction of information signal recorded in a magnetic recording medium such as a magnetic tape. A rated output from each magnetic head was measured. FIG. 13 shows reproducing properties of the two magnetic heads measured in the test. In the test, a relative speed between the magnetic tape and the magnetic head was 21.4 m/sec. and the coercive force of the magnetic tape was 1500 (Oe).

It is seen from FIG. 13 that the rated output was improved by use of a non-magnetic substrate of a ceramic having a smaller grain size. This is understood by the fact that the coercive force of the magnetic core is improved by use of the ceramic having the reduced grain size, as shown in FIG. 4.

Figure 14:
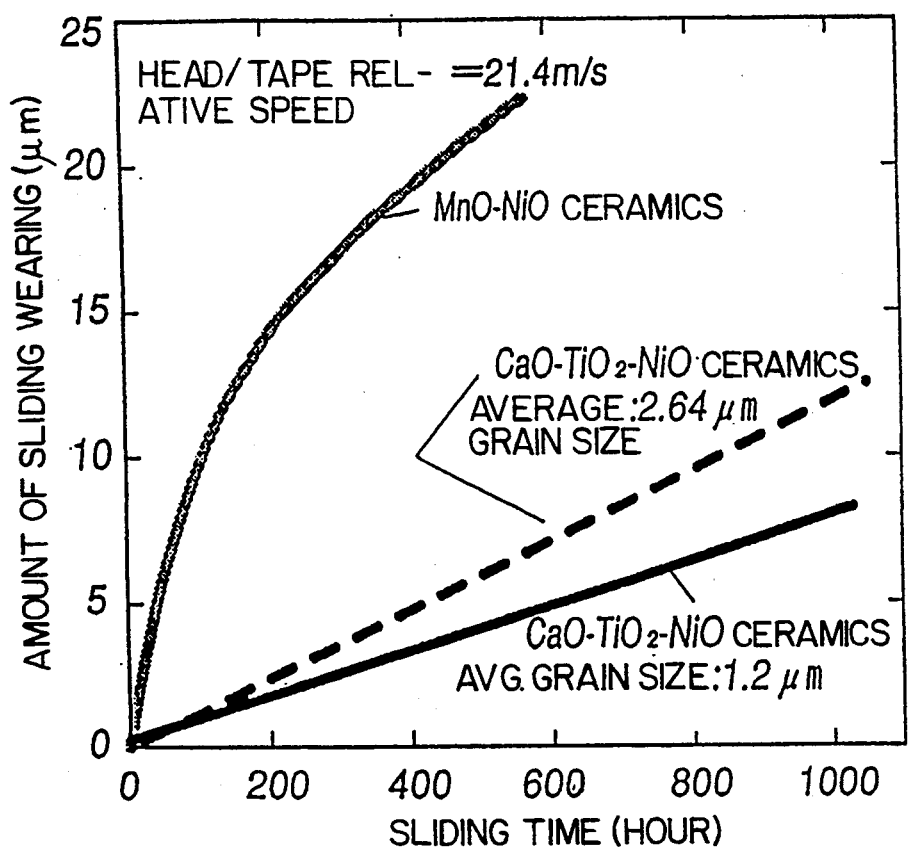
FIG. 14 is a view illustrating sliding wearing properties of magnetic heads according to two conventional types and an embodiment of the present invention.

Next, a wearing test was performed for each of the two magnetic heads described above. The relative speed between the magnetic tape and the magnetic head was 21.4 m/sec. and the magnetic tape was a metallic type wherein a magnetic powder coated on a plastic carrier tape. FIG. 14 shows sliding wearing property of the two magnetic heads tested and also shows, for the purpose of comparison, a sliding wearing property of a known magnetic head using MnO-NiO ceramic for the reinforcing non-magnetic substrate disclosed in reference I.

It will be understood from FIG. 14 that substitution of the $CaO-TiO_2-Ni$ substrate for MnO-NiO substrate considerably improves the wear resistance of the magnetic head. Moreover, the use of the $CaO-TiO_2-NiO$ substrate having fine grain size of 2 $\mu$m or less, excluding zero realizes a further improvement of the wear resistance of the magnetic head.

The advantage described above was obtained in not only use of FeSiAl film for the core material but also use of a film of FeSiAl having a small amount of additives such as Ru, Ti, Cr and others, and also use of another film of Fe-N-M (N being nitrogen, M being at lest one selected from Ta, Hf, Nb, Zr, V, and Ti).

The embodiments of the present invention have been described in conjunction with the magnetic head having the structure shown in FIG. 1. However, the present invention is applicable to various magnetic heads having different structures.

Figure 15:
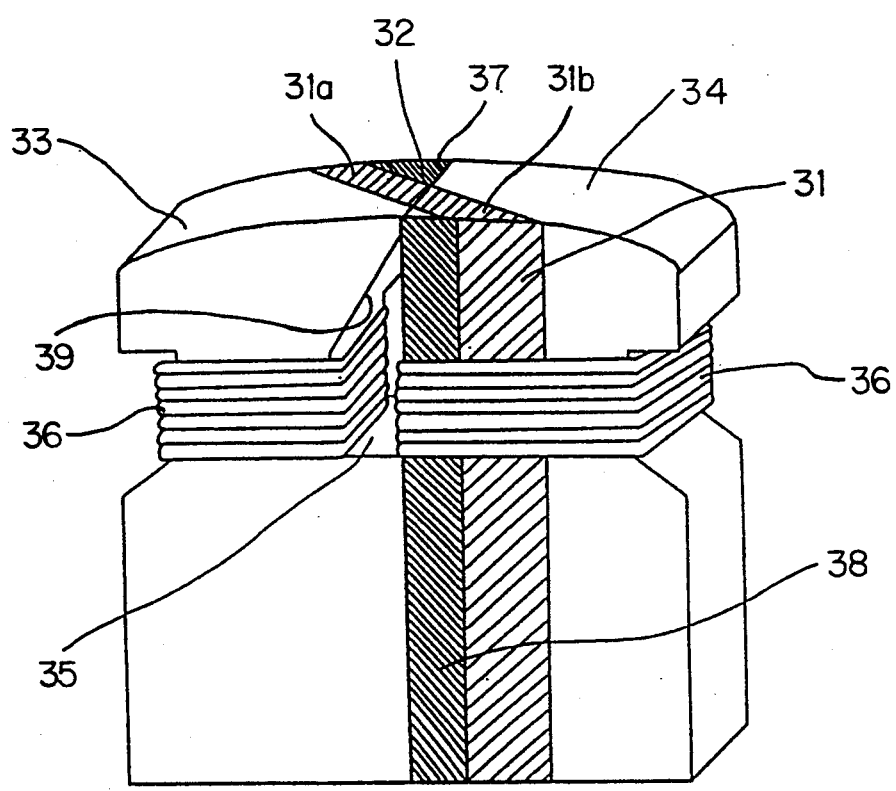
FIG. 15 is a view illustrating another magnetic head for which the present invention is applicable.

The similar advantage was also obtained by application of the present invention for a structure of a magnetic head as shown in FIG. 15.

Referring to FIG. 15, the magnetic head comprises a magnetic core 31 having a magnetic gap 32, and reinforcing non-magnetic substrates 32 and 33 holding the magnetic core 31. The magnetic core 31 and the non-magnetic substrates 33 and 34 form a penetrated hole as a winding opening 35. Coils 36 are wound on and around the magnetic core 31 and the non-magnetic substrates 33 and 34 through the winding opening 35.

In detail, magnetic films 31a and 31b are formed by, for example, sputtering onto tapered surfaces formed at end portion of the non-magnetic substrates 33 and 34, respectively. The non-magnetic substrate 33 and the magnetic film 31a are formed with a cut-away portion 39 at an end surface. Those non-magnetic substrates 33 and 34 having the magnetic films 31a and 31b are jointed together with each other at the end surfaces thereof by use of jointing glass layers 37 and 38. In this magnetic head, the magnetic core 31 is disposed in an inclined form with respect to the magnetic gap 32.

For the non-magnetic substrates 33 and 34 in the magnetic head, the ceramic can be used which essentially consists of, by weight, 2-30% CaO, 2-50% $TiO_2$, and 30-80% NiO, and has an average grain size of 2 $\mu$m or less. Another ceramic can also be used which essentially consists, by weight, of 2-30% CaO, 2-50% $TiO_2$, 30-80% NiO, and 0.1-2% $Al_2O_3$, and has an average grain size of 2 $\mu$m or less, excluding zero.

What is claimed is:

1. A non-magnetic substrate for a magnetic head which is made of a ceramic material consisting of CaO, $TiO_2$, and NiO, and having an average grain size of 2 $\mu$m or less, excluding zero.

2. A non-magnetic substrate as claimed in claim 1, wherein CaO, $TiO_2$, and NiO are 2-30 weight %, 2-50 weight %, and 30-80 weight %, respectively.

3. A non-magnetic substrate for a magnetic head which is made of a ceramic material consisting of CaO, $TiO_2$, NiO, and $Al_2O_3$ and having an average grain size of 2 $\mu$m or less, excluding zero.

4. A non-magnetic substrate as claimed in claim 3, wherein CaO, $TiO_2$, NiO, and $Al_2O_3$ are 2-30 weight %, 2-50 weight %, 30-80 weight %, and 0.1-2 weight %, respectively.

5. A magnetic head comprising a magnetic core having a magnetic gap and a penetrated hole, a pair of reinforcing members holding said magnetic core therebetween, each having an opening corresponding to said penetrated hole, and a winding wound onto said magnetic core and said reinforcing members through said penetrated hole and said opening, wherein each of said reinforcing member is a non-magnetic substrate which is made of a ceramic material consisting of CaO, $TiO_2$, and NiO and having an average grain size of 2 $\mu$m or less, excluding zero.

6. A magnetic head as claimed in claim 5, wherein CaO, $TiO_2$, and NiO are 2-30 weight %, 2-50 weight %, and 30-80 weight %, respectively.

7. A magnetic head comprising a magnetic core having a magnetic gap and a penetrated hole, a pair of reinforcing members holding said magnetic core therebetween, each having an opening corresponding to said penetrated hole, and a winding wound onto said magnetic core and said reinforcing members through said penetrated hole and said opening, wherein each of said reinforcing member is a non-magnetic substrate which is made of a ceramic material consisting of CaO, $TiO_2$, NiO, and $Al_2O_3$, and having an average grain size of 2 $\mu$m or less, excluding zero.

8. A magnetic head as claimed in claim 7, wherein CaO, $TiO_2$, NiO, and $Al_2O_3$ are 2-30 weight %, 2-50 weight %, 30-80 weight %, and 0.1-2 weight %, respectively.

9. A magnetic head as claimed in one of claims 5-8, wherein said magnetic core is made of a magnetic material essentially consisting of Fe, Si, and Al.

10. A magnetic head as claimed in one of claims 5-8, wherein said magnetic core is made of a magnetic material essentially consisting of Fe, N, and M (M is at least one selected from a group of Ta, Hf, Nb, Zr, V and Ti).

* * * * *

UNITED STATES PATENT AND TRADEMARK OFFICE
CERTIFICATE OF CORRECTION

PATENT NO.   : 5,404,259
DATED        : April 4, 1995
INVENTOR(S)  : Nobuyuki ISHIWATA et al.

It is certified that error(s) appears in the above-identified patent and that said Letters Patent is hereby corrected as shown below:

Column 5, line 7, delete "got" and insert --hot--.

Signed and Sealed this

Fourteenth Day of November, 1995

Attest:

BRUCE LEHMAN

*Attesting Officer*          *Commissioner of Patents and Trademarks*